United States Patent
Melpolder et al.

(10) Patent No.: US 6,287,754 B1
(45) Date of Patent: Sep. 11, 2001

(54) THERMALLY PROCESSABLE IMAGING ELEMENT COMPRISING AN ELECTROCONDUCTIVE AGENT AND A TRIBOELECTRIC CHARGE CONTROL AGENT

(75) Inventors: Sharon Marilyn Melpolder, Hilton; Christopher Edwin Wheeler, Fairport, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/883,012

(22) Filed: Jun. 26, 1997

Related U.S. Application Data

(63) Continuation of application No. 08/616,981, filed on Mar. 18, 1996, now abandoned.

(51) Int. Cl.⁷ ............... G03C 1/498; G03C 1/38
(52) U.S. Cl. ............ 430/527; 430/523; 430/617; 430/619; 430/631; 430/950
(58) Field of Search .................... 430/527, 523, 430/617, 619, 631, 950

(56) References Cited

U.S. PATENT DOCUMENTS

| | | |
|---|---|---|
| 3,850,642 * | 11/1974 | Bailey, Jr. et al. . |
| 4,741,992 | 5/1988 | Przezdziecki . |
| 4,828,971 | 5/1989 | Przezdziecki . |
| 4,942,115 | 7/1990 | Przezdziecki . |
| 5,279,934 * | 1/1994 | Smith et al. ............... 430/539 |
| 5,310,640 | 5/1994 | Markin et al. . |
| 5,547,821 * | 8/1996 | Melpolder et al. ............ 430/617 |
| 5,750,328 * | 5/1998 | Melpolder et al. ............ 430/619 |

FOREIGN PATENT DOCUMENTS

64/24245   1/1989   (JP) .

* cited by examiner

*Primary Examiner*—Thorl Chea
(74) *Attorney, Agent, or Firm*—Edith A. Rice; Chris P. Konkol

(57) ABSTRACT

Thermally processable imaging elements in which the image is formed by imagewise heating or by imagewise exposure to light followed by uniform heating are comprised of a support, a thermographic or photothermographic imaging layer, a protective overcoat layer which is an outermost layer on the same side of the support as the imaging layer, a backing layer which is an outermost layer on the side of the support opposite to the imaging layer, and an electroconductive agent in at least one layer of the element. Each of the protective overcoat layer and the backing layer contains a fluorosurfactant in an amount sufficient to serve as a triboelectric charge control agent and effective in providing essentially the same triboelectric charging characteristics to the backing layer as to the protective overcoat layer.

28 Claims, No Drawings

THERMALLY PROCESSABLE IMAGING ELEMENT COMPRISING AN ELECTROCONDUCTIVE AGENT AND A TRIBOELECTRIC CHARGE CONTROL AGENT

This is a Continuation of application Ser. No. 08/616,981, filed Mar. 18, 1996, now abandoned.

FIELD OF THE INVENTION

This invention relates in general to imaging elements and in particular to thermally processable imaging elements. More specifically, this invention relates to imaging elements which comprise a thermographic or photothermographic layer and which contain both an electroconductive agent and one or more triboelectric charge control agents.

BACKGROUND OF THE INVENTION

Thermally processable imaging elements, including films and papers, for producing images by thermal processing are well known. These elements include photothermographic elements in which an image is formed by imagewise exposure of the element to light followed by development by uniformly heating the element. These elements also include thermographic elements in which an image is formed by imagewise heating the element. Such elements are described in, for example, *Research Disclosure*, June 1978, Item No. 17029 and U.S. Pat. Nos. 3,080,254, 3,457,075 and 3,933,508.

The aforesaid thermally processable imaging elements are often provided with an overcoat layer and/or a backing layer, with the overcoat layer being the outermost layer on the side of the support on which the imaging layer is coated and the backing layer being the outermost layer on the opposite side of the support. Other layers which are advantageously incorporated in thermally processable imaging elements include subbing layers and barrier layers.

To be fully acceptable, a protective overcoat layer for such imaging elements should: (a) provide resistance to deformation of the layers of the element during thermal processing, (b) prevent or reduce loss of volatile components in the element during thermal processing, (c) reduce or prevent transfer of essential imaging components from one or more of the layers of the element into the overcoat layer during manufacture of the element or during storage of the element prior to imaging and thermal processing, (d) enable satisfactory adhesion of the overcoat to a contiguous layer of the element, (e) be free from cracking and undesired marking, such as abrasion marking, during manufacture, storage, and processing of the element, (f) provide adequate conveyance characteristics during manufacture and processing of the element, (g) not allow blocking, adhering or slippage of the element during manufacture, storage, or processing, (h) not induce undesirable sensitometric effects in the element during manufacture, storage or processing and (i) provide a moisture barrier to the imaging layer.

A backing layer also serves several important functions which improve the overall performance of thermally processable imaging elements. For example, a backing layer serves to improve conveyance, reduce electrostatic charging and eliminate formation of Newton Rings.

A particularly preferred overcoat for thermally processable imaging elements is an overcoat comprising poly(silicic acid) as described in U.S. Pat. No. 4,741,992, issued May 3, 1988. Advantageously, water-soluble hydroxyl-containing monomers or polymers are incorporated in the overcoat layer together with the poly(silicic acid). The combination of poly(silicic acid) and a water-soluble hydroxyl-containing monomer or polymer that is compatible with the poly(silicic acid) is also useful in a backing layer on the side of the support opposite to the imaging layer as described in U.S. Pat. No. 4,828,971, issued May 9, 1989.

U.S. Pat. No. 4,828,971 explains the requirements for backing layers in thermally processable imaging elements. It points out that an optimum backing layer must:

(a) provide adequate conveyance characteristics during manufacturing steps, (b) provide resistance to deformation of the element during thermal processing, (c) enable satisfactory adhesion of the backing layer to the support of the element without undesired removal during thermal processing, (d) be free from cracking and undesired marking, such as abrasion marking during manufacture, storage and processing of the element, (e) reduce static electricity effects during manufacture, processing and use, and (f) not provide undesired sensitometric effects in the element during manufacture, storage or processing.

With photothermographic elements, it is usually necessary to produce a "duplicate image" of that on the imaging element for low cost dissemination of the image. The duplication process is typically a "contact printing" process where intimate contact between the photothermographic imaging element and the duplication imaging element is essential. Successful duplication of either continuous rolls or cut sheets is dependent on adequate conveyance of the imaging element through the duplication equipment without the occurrence of slippage or sticking of the protective overcoat layer of the photothermographic imaging element in relation to any of (1) the duplication equipment, (2) the duplication imaging element or (3) the backing layer of subsequent portions of the photothermographic imaging element (adjacent convolutions of the photothermographic imaging element if in a continuous roll or adjacent "cut sheets" in a stacking configuration). The latter of these phenomena is often referred to as "blocking".

The addition of matte particles in the protective overcoat layer is commonly used to prevent adhering or "blocking" between the protective overcoat layer and adjacent backing layer with which it is in intimate contact during manufacture, storage, processing and photo duplication. Furthermore, the matte particles are necessary to impart anti-frictional characteristics to the protective overcoat layer to achieve proper conveyance without sticking, blocking or slippage during the duplication process. The amount and particle size must be controlled as the wrong particle size and/or amount can cause both conveyance and duplicate image quality problems.

The photothermographic imaging element is typically viewed at magnification ratios as high as 100×. The matte particle in the protective overcoat layer, if too large, can negatively alter the appearance of the image in the photothermographic imaging element layer when viewed at magnification larger than 1×. This altered image can further be transferred through the duplication process as well as a tertiary transformation of the image to paper through contact printing, electrophotographic processes, thermal printing or similar processes.

In order to provide antistatic protection, it is desirable to incorporate an electroconductive agent in at least one layer of a thermally-processable imaging element. The electroconductive agent can be present, for example, in the protective overcoat layer, in the backing layer or in a separate electroconductive layer. Incorporation of an electroconductive agent in a separate electroconductive layer is described in U.S. Pat. No. 5,310,640. Incorporation of an electroconductive agent in an outermost layer of the thermally-processable imaging element which also performs other functions is described in copending commonly-assigned U.S. Pat. No. 5,547,821, "Thermally Processable Imaging Element Comprising A Surface Layer That Is Electroconductive" by Sharon M. Melpolder et al, granted Aug. 20, 1996.

The protective overcoat layer of a thermally-processable imaging element can develop a triboelectric charge of a given polarity and magnitude as a consequence of contact with and separation from other materials during normal use in the imaging system for which it is intended. In a similar manner, the backing layer can also develop a triboelectric charge. The triboelectric charge produces an electric field of a given polarity and magnitude. The electroconductive layer of an adjacent thermally-processable element can be influenced by this electric field and charge migration can occur so as to concentrate charged ions within the electroconductive layer in proximity to the charged surface. This results in an electrostatic force of attraction between the two adjacent imaging elements. This force of attraction may be sufficiently strong as to cause adhesion of the two imaging elements. The adhesion can cause serious difficulties with regard to conveyance of the imaging elements through the imaging system as well as serious difficulties in manual handling operations such as stacking, sorting and filing.

It is toward the objective of providing an improved thermally-processable imaging element, that overcomes the problems hereinabove described, that this invention is directed.

SUMMARY OF THE INVENTION

In accordance with this invention, a thermally processable imaging element is comprised of:

(1) a support;

(2) a thermographic or photothermographic imaging layer on one side of the support;

(3) a protective overcoat layer which is an outermost layer on the same side of the support as the imaging layer;

(4) a backing layer which is an outermost layer located on the side of the support opposite to the imaging layer; and (5) an electroconductive agent in at least one layer of the imaging element;

wherein each of the protective overcoat layer and the backing layer contains a fluorosurfactant in an amount sufficient to serve as a triboelectric charge control agent and effective in providing essentially the same triboelectric charging characteristics to the backing layer as to the protective overcoat layer.

The electroconductive agent utilized in this invention can be incoporated in the backing layer or in the protective overcoat layer or in a separate layer on the same side of the support as the backing layer or on the same side of the support as the protective overcoat layer.

In this invention, the backing layer and the protective overcoat layer are formulated in a manner that reduces tribolectrical charging and thus reduces the electrostatic forces which impact the imaging element during its intended use.

The same fluorosurfactant or different fluorosurfactants can be incorporated in the backing layer and the protective overcoat layer, and the amounts of fluorosurfactants in these layers can be the same or different as long as these layers exhibit essentially the same triboelectric charging characteristics, i.e., one of these layers should not undergo triboelectric charging to a significantly greater extent than the other. Variation in the type and/or amount of fluorosurfactant may be necessary to achieve this objective since the triboelectric charging characteristics are influenced by layer composition as well as by the presence of a fluorosurfactant. Either or both of the backing layer and protective overcoat layer can contain more than one fluorosurfactant, if desired.

Further advantages of incorporating a fluorosurfactant in the protective overcoat layer are that it provides both enhanced moisture resistance and improved adhesion to the imaging layer.

DESCRIPTION OF THE PREFERRED EMBODIMENTS

The thermally processable imaging element of this invention can be of the type in which an image is formed by imagewise heating of the element or of the type in which an image is formed by imagewise exposure to light followed by uniform heating of the element. The latter type of element is commonly referred to as a photothermographic element.

Typical photothermographic imaging elements within the scope of this invention comprise at least one imaging layer containing in reactive association in a binder, preferably a binder comprising hydroxyl groups, (a) photographic silver halide prepared in situ and/or ex situ, (b) an image-forming combination comprising (i) an organic silver salt oxidizing agent, preferably a silver salt of a long chain fatty acid, such as silver behenate, with (ii) a reducing agent for the organic silver salt oxidizing agent, preferably a phenolic reducing agent, and (c) an optional toning agent. References describing such imaging elements include, for example, U.S. Pat. Nos. 3,457,075; 4,459,350; 4,264,725 and 4,741,992 and *Research Disclosure*, June 1978, Item No. 17029.

The photothermographic element comprises a photosensitive component that consists essentially of photographic silver halide. In the photothermographic material it is believed that the latent image silver from the silver halide acts as a catalyst for the described image-forming combination upon processing. A preferred concentration of photographic silver halide is within the range of 0.01 to 10 moles of photographic silver halide per mole of silver behenate in the photothermographic material. Other photosensitive silver salts are useful in combination with the photographic silver halide if desired. Preferred photographic silver halides are silver chloride, silver bromide, silver bromochloride, silver bromoiodide, silver chlorobromoiodide, and mixtures of these silver halides. Very fine grain photographic silver halide is especially useful. The photographic silver halide can be prepared by any of the known procedures in the photographic art. Such procedures for forming photographic silver halides and forms of photographic silver halides are described in, for example, *Research Disclosure*, December 1978, Item No. 17029 and *Research Disclosure*, June 1978, Item No. 17643. Tabular grain photosensitive silver halide is also useful, as described in, for example, U.S. Pat. No. 4,435,499. The photographic silver halide can be unwashed or washed, chemically sensitized, protected against the formation of fog, and stabilized against the loss of sensitivity during keeping as described in the above Research Disclosure publications. The silver halides can be prepared in situ as described in, for example, U.S. Pat. No. 4,457,075, or prepared ex situ by methods known in the photographic art.

The photothermographic element typically comprises an oxidation-reduction image forming combination that contains an organic silver salt oxidizing agent, preferably a silver salt of a long chain fatty acid. Such organic silver salts are resistant to darkening upon illumination. Preferred organic silver salt oxidizing agents are silver salts of long chain fatty acids containing 10 to 30 carbon atoms. Examples of useful organic silver salt oxidizing agents are silver behenate, silver stearate, silver oleate, silver laurate, silver hydroxystearate, silver caprate, silver myristate, and silver palmitate. Combinations of organic silver salt oxidizing agents are also useful. Examples of useful organic silver salt oxidizing agents that are not organic silver salts of fatty acids are silver benzoate and silver benzotriazole.

The optimum concentration of organic silver salt oxidizing agent in the photothermographic element will vary depending upon the desired image, particular organic silver salt oxidizing agent, particular reducing agent and particular photothermographic element. A preferred concentration of organic silver salt oxidizing agent is within the range of 0.1 to 100 moles of organic silver salt oxidizing agent per mole of silver halide in the element. When combinations of organic silver salt oxidizing agents are present, the total concentration of organic silver salt oxidizing agents is preferably within the described concentration range.

A variety of reducing agents are useful in the photothermographic element. Examples of useful reducing agents in the image-forming combination include substituted phenols and naphthols, such as bis-beta-naphthols; polyhydroxybenzenes, such as hydroquinones, pyrogallols and catechols; aminophenols, such as 2,4-diaminophenols and methylaminophenols; ascorbic acid reducing agents, such as ascorbic acid, ascorbic acid ketals and other ascorbic acid derivatives; hydroxylamine reducing agents; 3-pyrazolidone reducing agents, such as 1-phenyl-3-pyrazolidone and 4-methyl-4-hydroxymethyl-1-phenyl-3-pyrazolidone; and sulfonamidophenols and other organic reducing agents known to be useful in photothermographic elements, such as described in U.S. Pat. No. 3,933,508, U.S. Pat. No. 3,801,321 and *Research Disclosure*, June 1978, Item No. 17029. Combinations of organic reducing agents are also useful in the photothermographic element.

Preferred organic reducing agents in the photothermographic element are sulfonamidophenol reducing agents, such as described in U.S. Pat. No. 3,801,321. Examples of useful sulfonamidophenol reducing agents are 2,6-dichloro-4-benzene-sulfonamidophenol; benzenesulfonamidophenol; and 2,6-dibromo-4-benzenesulfonamidophenol, and combinations thereof.

An optimum concentration of organic reducing agent in the photothermographic element varies depending upon such factors as the particular photothermographic element, desired image, processing conditions, the particular organic silver salt and the particular oxidizing agent.

The photothermographic element preferably comprises a toning agent, also known as an activatortoner or toner-accelerator. Combinations of toning agents are also useful in the photothermographic element. Examples of useful toning agents and toning agent combinations are described in, for example, *Research Disclosure*, June 1978, Item No. 17029 and U.S. Pat. No. 4,123,282. Examples of useful toning agents include, for example, phthalimide, N-hydroxyphthalimide, N-potassium-phthalimide, succinimide, N-hydroxy-1,8-naphthalimide, phthalazine, 1-(2H)-phthalazinone and 2-acetylphthalazinone.

Post-processing image stabilizers and latent image keeping stabilizers are useful in the photothermographic element. Any of the stabilizers known in the photothermographic art are useful for the described photothermographic element. Illustrative examples of useful stabilizers include photolytically active stabilizers and stabilizer precursors as described in, for example, U.S. Pat. No. 4,459,350. Other examples of useful stabilizers include azole thioethers and blocked azolinethione stabilizer precursors and carbamoyl stabilizer precursors, such as described in U.S. Pat. No. 3,877,940.

The thermally processable elements as described preferably contain various colloids and polymers alone or in combination as vehicles and binders and in various layers. Useful materials are hydrophilic or hydrophobic. They are transparent or translucent and include both naturally occurring substances, such as gelatin, gelatin derivatives, cellulose derivatives, polysaccharides, such as dextran, gum arabic and the like; and synthetic polymeric substances, such as water-soluble polyvinyl compounds like poly(vinylpyrrolidone) and acrylamide polymers. Other synthetic polymeric compounds that are useful include dispersed vinyl compounds such as in latex form and particularly those that increase dimensional stability of photographic elements. Effective polymers include water insoluble polymers of acrylates, such as alkylacrylates and methacrylates, acrylic acid, sulfoacrylates, and those that have cross-linking sites. Preferred high molecular weight materials and resins include poly(vinyl butyral), cellulose acetate butyrate, poly(methylmethacrylate), poly(vinylpyrrolidone), ethyl cellulose, polystyrene, poly(vinylchloride), chlorinated rubbers, polyisobutylene, butadiene-styrene copolymers, copolymers of vinyl chloride and vinyl acetate, copolymers of vinylidene chloride and vinyl acetate, poly(vinyl alcohol) and polycarbonates.

Photothermographic elements and thermo-graphic elements as described can contain addenda that are known to aid in formation of a useful image. The photothermographic element can contain development modifiers that function as speed increasing compounds, sensitizing dyes, hardeners, antistatic agents, plasticizers and lubricants, coating aids, brighteners, absorbing and filter dyes, such as described in *Research Disclosure*, December 1978, Item No. 17643 and *Research Disclosure*, June 1978, Item No. 17029.

The thermally processable element can comprise a variety of supports. Examples of useful supports are poly(vinylacetal) film, polystyrene film, poly(ethyleneterephthalate) film, poly(ethylene naphthalate) film, polycarbonate film, and related films and resinous materials, as well as paper, glass, metal, and other supports that withstand the thermal processing temperatures.

The layers of the thermally processable element are coated on a support by coating procedures known in the photographic art, including dip coating, air knife coating, curtain coating or extrusion coating using hoppers. If desired, two or more layers are coated simultaneously.

Spectral sensitizing dyes are useful in the photothermographic element to confer added sensitivity to the element. Useful sensitizing dyes are described in, for example, *Research Disclosure*, June 1978, Item No. 17029 and *Research Disclosure*, December 1978, Item No. 17643.

A photothermographic element as described preferably comprises a thermal stabilizer to help stabilize the photothermographic element prior to exposure and processing. Such a thermal stabilizer provides improved stability of the photothermographic element during storage. Preferred thermal stabilizers are 2-bromo-2-arylsulfonylacetamides, such as 2-bromo-2-p-tolylsulfonylacetamide; 2-(tribromomethyl sulfonyl)benzothiazole; and 6-substituted-2,4-bis (tribromomethyl)-s-triazines, such as 6-methyl or 6-phenyl-2,4-bis(tribromomethyl)-s-triazine.

The thermally processable elements are exposed by means of various forms of energy. In the case of the photothermographic element such forms of energy include those to which the photographic silver halides are sensitive and include ultraviolet, visible and infrared regions of the electromagnetic spectrum as well as electron beam and beta radiation, gamma ray, x-ray, alpha particle, neutron radiation and other forms of corpuscular wave-like radiant energy in either non-coherent (random phase) or coherent (in phase) forms produced by lasers. Exposures are monochromatic, orthochromatic, or panchromatic depending upon the spectral sensitization of the photographic silver halide. Imagewise exposure is preferably for a time and intensity sufficient to produce a developable latent image in the photothermographic element.

After imagewise exposure of the photothermographic element, the resulting latent image is developed merely by overall heating the element to thermal processing temperature. This overall heating merely involves heating the photothermographic element to a temperature within the range of about 90° C. to 180° C. until a developed image is formed, such as within about 0.5 to about 60 seconds. By increasing or decreasing the thermal processing temperature a shorter or longer time of processing is useful. A preferred thermal processing temperature is within the range of about 100° C. to about 140° C.

In the case of a thermographic element, the thermal energy source and means for imaging can be any imagewise thermal exposure source and means that are known in the thermographic imaging art. The thermographic imaging means can be, for example, an infrared heating means, laser, microwave heating means or the like.

Heating means known in the photothermo-graphic and thermographic imaging arts are useful for providing the desired processing temperature for the exposed photothermographic element. The heating means is, for example, a simple hot plate, iron, roller, heated drum, microwave heating means, heated air or the like.

Thermal processing is preferably carried out under ambient conditions of pressure and humidity. Conditions outside of normal atmospheric pressure and humidity are useful.

The components of the thermally processable element can be in any location in the element that provides the desired image. If desired, one or more of the components can be in one or more layers of the element. For example, in some cases, it is desirable to include certain percentages of the reducing agent, toner, stabilizer and/or other addenda in the overcoat layer over the photothermographic imaging layer of the element. This, in some cases, reduces migration of certain addenda in the layers of the element.

It is necessary that the components of the imaging combination be "in association" with each other in order to produce the desired image. The term "in association" herein means that in the photothermographic element the photographic silver halide and the image forming combination are in a location with respect to each other that enables the desired processing and forms a useful image.

As hereinabove described, the thermally processable imaging element of this invention includes an electroconductive agent in at least one layer thereof and each of the protective overcoat layer and the backing layer contains at least one fluorosurfactant. The fluorosurfactants are included in the protective overcoat layer and the backing layer to serve as triboelectric charge control agents and the amount and type of fluorosurfactant used in each of these layers is such that these layers have essentially the same triboelectric charging characteristics.

The backing layer utilized in this invention is an outermost layer and is located on the side of the support opposite to the imaging layer. It is comprised of a binder and a matting agent which is dispersed in the binder in an amount sufficient to provide the desired surface roughness.

A wide variety of materials can be used to prepare a backing layer that is compatible with the requirements of thermally processable imaging elements. The backing layer should preferably be transparent and colorless and should not adversely affect sensitometric characteristics of the photothermographic element such as minimum density, maximum density and photographic speed. Useful backing layers include those comprised of poly(silicic acid) and a water-soluble hydroxyl containing monomer or polymer that is compatible with poly(silicic acid) as described in U.S. Pat. No. 4,828,971. A combination of poly(silicic acid) and poly(vinyl alcohol) is particularly useful. Other useful backing layers include those formed from polymethylmethacrylate, cellulose acetate, crosslinked polyvinyl alcohol, terpolymers of acrylonitrile, vinylidene chloride, and 2-(methacryloyloxy)ethyltrimethylammonium methosulfate, crosslinked gelatin, polyacrylamides, polyesters, polyurethanes and combinations thereof.

In the thermally processable imaging elements of this invention, either organic or inorganic matting agents can be used and they can be utilized in one or more than one of the layers such as in both the protective overcoat layer and the backing layer. Examples of organic matting agents are particles, often in the form of beads, of polymers such as polymeric esters of acrylic and methacrylic acid, e.g., poly (methylmethacrylate), styrene polymers and copolymers, and the like. Examples of inorganic matting agents are particles of glass, silicon dioxide, titanium dioxide, magnesium oxide, aluminum oxide, barium sulfate, calcium carbonate, and the like. Matting agents and the way they are used are further described in U.S. Pat. Nos. 3,411,907 and 3,754,924.

Polymeric matte particles comprising a polymeric core, such as a core comprised of crosslinked methyl methacrylate, surrounded by a layer of colloidal inorganic particles, such as a layer of silica particles, are especially useful in the thermally processable imaging elements of this invention. Such polymeric matte particles are described in U.S. Pat. No. 5,378,577 and use thereof in thermally processable imaging elements is disclosed in copending commonly-assigned U.S. patent application Ser. No. 421, 178, filed Apr. 13, 1995, "Thermally Processable Imaging Element Comprising Polymeric Matte Particles" by Sharon M. Melpolder, Dennis E. Smith, Christopher E. Wheeler and John L. Muehlbauer.

The backing layer preferably has a glass transition temperature (Tg) of greater than 50° C., more preferably greater than 100° C., and a surface roughness such that the Roughness Average (Ra) value is greater than 0.8, more preferably greater than 1.2, and most preferably greater than 1.5.

As described in U.S. Pat. No. 4,828,971, the Roughness Average (Ra) is the arithmetic average of all departures of the roughness profile from the mean line.

The concentration of matting agent required to give the desired roughness depends on the mean diameter of the particles and the amount of binder. Preferred particles are those with a mean diameter of from about 1 to about 15 micrometers, preferably from 2 to 8 micrometers. The matte particles can be usefully employed at a concentration of about 1 to about 100 milligrams per square meter.

An electroconductive agent is a required component of the thermally processable imaging elements of this invention. It can be included in a layer whose sole function is to serve as an electroconductive layer or it can be included in a layer having other functions such as in the backing layer or in the protective overcoat layer. The layer containing the electroconductive agent preferably has an internal resistivity of less than $5 \times 10^{10}$ ohms/square and most preferably of less than $1 \times 10^{10}$ ohms/square.

The electroconductive layer can be composed of any of a very wide variety of compositions which are capable of forming a layer with suitable physical and electrical properties to be compatible with the requirements of thermally processable imaging elements. Included among the useful electroconductive layers are:

(1) Electroconductive layers comprised of electrically-conductive metal-containing particles dispersed in a polymeric binder. Examples of useful electrically-conductive metal-containing particles include donor-doped metal oxide, metal oxides containing oxygen deficiencies and conductive nitrides, carbides or borides. Specfic examples of particularly useful particles include conductive $TiO_2$, $SnO_2$, $Al_2O_3$, $ZrO_2$, $In_2O_3$, ZnO, $TiB_2$, $ZrB_2$, $NbB_2$, $TaB_2$, $CrB_2$, MoB, WB, $LaB_6$, ZrN, TiN, TiC, WC, HfC, HfN and ZrC.

Examples of the many patents describing electrically-conductive metal-containing particles that are useful in this invention include:

(a) semiconductive metal salts such as cuprous iodide as described in U.S. Pat. Nos. 3,245,833, 3,428,451 and 5,075,171;

(b) metal oxides, preferably antimony-doped tin oxide, aluminum-doped zinc oxide and niobium-doped titanium oxide as described in U.S. Pat. Nos. 4,275,103, 4,394,441, 4,416,963, 4,418,141, 4,431,764, 4,495,276, 4,571,361, 4,999,276 and 5,122,445;

(c) a colloidal gel of vanadium pentoxide as described in U.S. Pat. Nos. 4,203,769 and 5,006,451;

(d) fibrous conductive powders comprising, for example, antimony-doped tin oxide coated onto non-conductive potassium titanate whiskers as described in U.S. Pat. Nos. 4,845,369 and 5,116,666;

(e) electroconductive ceramic particles, such as particles of TiN, $NbB_2$, TiC, $LaB_6$ or MoB dispersed in a binder as described in Japanese KOKAI NO. 4/55492, published Feb. 24, 1992;

(f) electronically-conductive metal antimonates as described in U.S. Pat. No. 5,368,995.

(2) Electroconductive layers composed of a vapor-deposited metal such as silver, aluminum or nickel;

(3) Electroconductive layers composed of binderless electrically-semiconductive metal oxide thin films formed by oxidation of vapor-deposited metal films as described in U.S. Pat. No. 4,078,935.

(4) Electroconductive layers composed of conductive polymers such as, for example, the cross-linked vinylbenzyl quaternary ammonium polymers of U.S. Pat. No. 4,070,189 or the conductive polyanilines of U.S. Pat. No. 4,237,194.

A colloidal gel of vanadium pentoxide is especially useful for forming the electroconductive layer. When vanadium pentoxide is used for this purpose, it is desirable to interpose a barrier layer between the electroconductive layer and the imaging layer so as to inhibit migration of vanadium pentoxide from the electroconductive layer into the imaging layer with resulting adverse sensitometric affects. Suitable barrier layers include those having the same composition as the backing layer of U.S. Pat. No. 4,828,971, namely, a mixture of poly(silicic acid) and a water-soluble hydroxyl-containing monomer or polymer.

Use in this invention of a colloidal gel of vanadium pentoxide, the preparation of which is described in U.S. Pat. No. 4,203,769, issued May 20, 1980, has many important beneficial advantages. The colloidal vanadium pentoxide gel typically consists of entangled, high aspect ratio, flat ribbons about 50–100 angstroms wide, about 10 angstroms thick and about 1000–10000 angstroms long. The ribbons stack flat in the direction parallel to the surface when the gel is coated to form a conductive layer. The result is very high electrical conductivities which are typically about three orders of magnitude greater than is observed for layers of similar thickness containing crystalline vanadium pentoxide particles. Low surface resistivities can be obtained with very low vanadium pentoxide coverages. This results in low optical absorption and scattering losses. Also, the coating containing the colloidal vanadium pentoxide gel is highly adherent to underlying support materials.

The thermally processable imaging elements of this invention include an overcoat layer. The overcoat layer performs several important functions as hereinabove described. It can be composed of hydrophilic colloids such as gelatin or poly(vinyl alcohol) but is preferably composed of poly(silicic acid) and a water-soluble hydroxyl-containing monomer or polymer as described in U.S. Pat. No. 4,741,992, issued May 3, 1988. Preferably, the overcoat layer is transparent or at least essentially transparent.

Subbing layers can also be included in the thermally processable imaging elements of this invention. Particularly useful subbing layers are the polymeric adhesion-promoting layers described in U.S. Pat. No. 4,942,115, issued Jul. 17, 1990. As disclosed in the '115 patent, preferred adhesion-promoters are terpolymers of 2-propenenitrile, 1,1-dichloroethylene and propenoic acid and terpolymers of the methyl ester of 2-propenoic acid, 1,1-dichloroethylene and itaconic acid.

Thicknesses for the various layers utilized in the thermally processable imaging elements of this invention can be widely varied as desired. Representative dry thicknesses are from about 0.1 to about 2 micrometers for the backing layer, from about 0.01 to about 1 micrometers for an electroconductive layer, from about 0.5 to about 3 micrometers for a barrier layer, from about 1 to about 12 micrometers for the imaging layer and from about 1 to about 10 micrometers for the overcoat layer.

The fluorosurfactants utilized in this invention as triboelectric charge control agents are well known and many suitable fluorosurfactants are commercially available. Both ionic and non-ionic fluorosurfactants can be utilized in this invention but the non-ionic fluorosurfactants are preferred. The non-ionic fluorosurfactants are especially beneficial in providing improved adhesion and enhanced moisture resistance and in reducing agglomeration of matte particles which gives improved appearance.

Preferred fluorosurfactants for use in this invention contain fluorine-substituted aliphatic moieties of 6 to 16 carbon atoms, wherein the aliphatic moieties can contain mixtures of aliphatic chains varying from 6 to 16 carbon atoms, and polyether moieties wherein the polyether chain varies from 9 to 14 ether linkages and includes varying lengths of polyether linkages within the length of from 9 to 14. The polyester moiety can include polyethylene or polypropylene segments.

Particularly preferred fluorosurfactants are fluoroalkyl polyethers or mixtures of fluoroalkyl polyethers of the formula:

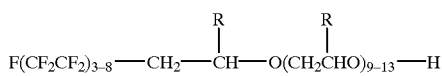

wherein R is hydrogen or methyl.

Examples of commercially available fluorosurfactants which are useful in the present invention include the following:

(1) FC-135 fluorosurfactant which is available from Minnesota Mining and Manufacturing Company and is a cationic fluorosurfactant in which the active agent is comprised of flurorinated alkyl quaternary ammonium iodides such as the iodide of the formula:

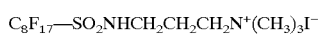

(2) FC-431 fluorosurfactant which is available from Minnesota Mining and Manufacturing Company and is a non-ionic fluorosurfactant comprised of a mixture of fluoroaliphatic polymeric esters.

(3) Lodyne S-100 fluorosurfactant which is a non-ionic fluorosurfactant available from Ciba Geigy Corporation and is a mixture of compounds of the formula:

and

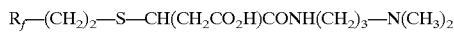

wherein $R_f$ is a mixture of $C_6F_{13}$, $C_8F_{17}$ and $C_{10}F_{21}$ (4) Zonyl FSN fluorosurfactant which is a non-ionic fluorosurfactant available from DuPont and has the formula:

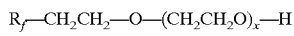

wherein $R_f$ is a mixture of fluoroalkyl groups averaging about $C_8F_{17}$ and x is 8–12.

In the present invention, the fluorosurfactant can be utilized in any amount which is effective to serve as a triboelectric charge control agent. Preferred amounts for use in either the backing layer or the protective overcoat layer are in the range of from about 0.005 to aobut 0.1 weight percent and particularly preferred amounts are in the range of from about 0.01 to about 0.06 weight percent.

The thermally processable imaging elements described herein are commonly utilized in COM (Computer Output Microfilm) equipment which utilizes rubber or metal pinch rollers at the exit of the processor drum. Triboelectric charging occurs as a fiche passes thorugh the pinch rollers and, as a consequence, an electrostatic force of attraction exists between adjacent fiche in a hopper stack. The electrostatic force of attraction is partially dependent on the amount of pinch roller nip pressure and at high pressures can be strong enough to cause adjacent fiche to stick together. This problem is eliminated, or at least minimized, by use of fluorosurfactants in the manner described herein.

The invention is further illustrated by the following examples of its practice.

EXAMPLES 1–7

A thermally processable imaging element was prepared using a 0.1 millimeter thick polyethylene terephthalate film, subbed on the non-imaging side only, as a support. The subbed polyethylene terephthalate film was coated on the subbed side with an antistatic layer and with a backing layer having a dry thickness of 0.5 micrometers and on its opposite side with an imaging layer having a dry thickness of 7 micrometers and a protective overcoat layer having a dry thickness of 2 micrometers.

The composition of the imaging layer was substantially the same as that described in Example 1 of U.S. Pat. No. 4,741,992. The antistatic layer contained silver-doped vanadium pentoxide at a coverage of 3 milligrams/square meter as the electroconductive agent and AQ 29 polyesterionomer, manufactured by Eastman Chemical Company, as the binder. The backing layer was comprised of matte particles, consisting of a crosslinked copolymer of methyl methacrylate and ethylene glycol dimethacrylate, dispersed in a polymethylmethacrylate binder and contained FC-431 fluorosurfactant in an amount of 0.04 weight percent.

To evaluate the effect of different fluorosurfactants in the protective overcoat, the following compositions were prepared.

Control

To prepare the overcoat, a poly(silicic acid) solution was formulated by mixing the following components in the order indicated:

| Distilled water | 172.8 g |
| --- | --- |
| 1-N p-toluene sulfonic acid | 7.2 g |
| Nethanol | 200.0 g |
| Tetraethyl orthosilicate | 208.0 g |

A polyvinyl alcohol solution was prepared by adding ELVANOL 52/22 polyvinyl alcohol, available from E. I. duPont deNemours Corporation, to water in an amount sufficient to provide a 6.1% by weight concentration.

To prepare a coating composition suitable for forming the protective overcoat layer, the poly(silicic acid) solution and the polyvinyl alcohol solution were admixed together with surfactant and matte particles. The surfactant employed was surfactant 10G from Olin Mathieson Chemical Company (a para-isononylphenoxy polyglycidol) and the matte particles comprised a 28.5% solids dispersion of particles having a polymeric core, composed of vinyl toluene crosslinked with divinylbenzene, surrounded by a layer of silica particles. These matte particles and methods for their preparation are described in U.S. Pat. No. 5,378,577. The overcoat formulation was as follows:

| Distilled water | 53.29 g |
| --- | --- |
| Poly(silicic acid) solution | 18.54 g |
| Polyvinyl alcohol solution | 27.08 g |
| 10G Surfactant (1.0% solution) | 0.83 g |
| Matte particles 28.5% solids solution) | 1.00 g |

For each of Examples 1 to 7, the coating composition for preparation of the overcoat was the same as that described above for the control except that it additionally contained a fluorosurfactant as follows:

| Example No. | Fluorosurfactant | Amount of Fluorosurfactant (grams) |
|---|---|---|
| 1 | Zonyl FSN (4% solution) | 0.26 |
| 2 | Zonyl FSN (4% solution) | 1.04 |
| 3 | Zonyl FSN (4% solution) | 1.42 |
| 4 | Lodyne S-100 (0.7% solution) | 0.47 |
| 5 | Lodyne S-100 (0.7% solution) | 0.61 |
| 6 | Lodyne S-100 (0.7% solution) | 0.73 |
| 7 | FC-135 (0.97% solution) | 0.33 |

In evaluating the thermally processable imaging elements, the following tests were employed:

Water Spot Test

A drop of room temperature tap water is placed on the surface of the overcoat layer by means of an eyedropper and allowed to remain on the surface for 30 seconds and is subsequently removed by blotting with a clean white cotton cloth. The results are interpreted by a subjective evaluation of the extent of surface degradation in accordance with the following rating scale:

0—None

1—Trace

3—Slight

5—Moderate

7—Severe (peeling or cracking of the surface).

Contact Angle

Contact angles are measured using the static sessile drop method. All measurements are made on a Rame-Hart goniometer. The drop size is 75 microliters. Doubly distilled water is used as the probe liquid. For each sample, the reported contact angle is the average of five separate drops. All measurements are made at a temperature of 22° C.

Peel Force

The adhesive peel force is measured in grams. The samples are conditioned at 23° C./50% relative humidity for a minimum of 24 hours before testing. The tape used for the peel force determination is yellow tape #471 manufactured by Minnesota Mining and Manufacturing Corporation which is a pigmented vinyl plastic tape with a rubber-based pressure sensitive adhesive having an average adhesive strength on steel (ASTM D3330) of 279 grams/centimeter. The sample width is 1.9 centimeters and the sample is peeled at a 180 degree angle for a length of 10 centimeters. The test involves applying the tape to the sample, slitting the sample to the width of the tape, initiating the peel, and measuring the load required to propagate the peel.

Impact Charge Test

The purpose of this test is to determine the charging characteristics of two surfaces upon intimate contact and extremely rapid separation. The test involves a high pressure contact of very short duration with subsequent high velocity "free recoil" separation. Testing is carried out at 20° C. and 50% relative humidity and at 20° C. and 20% relative humidity. The impact instrument includes an internal electrometer. Testing is performed with a plunger head that contacts the overcoat layer of the test sample that is being evaluated. In a first test series, the plunger head is equipped with a metal surface. In a second test series, the plunger head is equipped with a rubber surface. The charge that is generated is measured in microcoulombs per square meter.

For the control, the water contact angle (degrees) was 51.9, the average adhesive peel force was 7 grams and the rating in the water spot test was 7. By comparison, in Example 2 the water contact angle was 51.1, the average adhesive peel force was 11 grams and the rating in the water spot test was zero. Thus, incorporation of the fluorosurfactant in the overcoat layer improves adhesion so that a significantly greater peel force is required to separate the overcoat and the imaging layer. No difference in wetting is observed as a function of water contact angle measurement, but the water spot test indicates improved adhesion between the overcoat and the imaging layer as a result of addition of the fluorosurfactant to the overcoat formulation.

The results obtained in the impact charge test are summarized in Table 1 below in which all values reported are in microcoulombs per square meter and the amount of fluorosurfactant employed in the overcoat is specified in milligrams per square meter.

TABLE 1

| Example No. | Fluorosurfactant | Amount of Fluorosurfactant (mg/m$^2$) | 50% RH (Rubber) | 50% RH (Metal) | 20% RH (Rubber) | 20% RH (Metal) |
|---|---|---|---|---|---|---|
| Control | None | 0 | 53.2 | 15.2 | 62.0 | 6.2 |
| 1 | Zonyl FSN | 3.66 | 27.4 | 7.5 | 26.1 | −2.0 |
| 2 | Zonyl FSN | 14.84 | 4.6 | −1.0 | −5.1 | −9.6 |
| 3 | Zonyl FSN | 20.22 | −4.9 | −6.3 | −1.6 | −12.5 |
| 4 | Lodyne S-100 | 0.97 | 6.0 | 11.8 | — | 2.3 |
| 5 | Lodyne S-100 | 1.51 | 11.7 | 25.2 | 2.2 | 10.8 |
| 6 | Lodyne S-100 | 1.61 | −1.3 | 2.7 | −1.1 | −5.4 |
| 7 | FC-135 | 1.08 | −7.1 | −2.5 | −2.2 | −12.1 |

As indicated by the data in Table 1, incorporation of a fluorosurfactant in the overcoat layer results in a significant reduction in the degree of triboelectric charging as compared to the control sample which contained no fluorosurfactant in the overcoat layer.

In the present invention, the electroconductive agent serves to dissipate electrostatic charge which is formed during the manufacture and/or use of the imaging element while the fluorosurfactant serves as a triboelectric charge control agent to reduce the tendency for electrostatic charge to form. Use of the electroconductive agent and the fluorosurfactant in combination provides imaging elements which have excellent conveyance characteristics and overcomes the problems related to the tendency of electrostatic forces to cause adhesion of adjacent imaging elements. Additional advantages from the use of fluorosurfactants are those relating to improved adhesion of the overcoat to the imaging layer, enhanced moisture resistance and improved appearance.

The invention has been described in detail, with particular reference to certain preferred embodiments thereof, but it should be understood that variations and modifications can be effected within the spirit and scope of the invention.

We claim:

1. A cut sheet of a therrnally-processable imaging element, said element comprising:
   (1) a support;
   (2) a thermographic or photothermographic imaging layer on one side of said support;
   (3) a protective overcoat layer which is an outermost layer on the same side of said support as said imaging layer;
   (4) a backing layer which is an outermost layer located on the side of said support opposite to said imaging layer; and
   (5) an electroconductive agent in at least one layer of said imaging element;
   wherein each of said protective overcoat layer and said backing layer contains a fluorosurfactant in an amount sufficient to serve as a triboelectric charge control agent and effective in providing essentially the same triboelectric charging characteristics to said backing layer as to said protective overcoat layer.

2. A thermally processable imaging element as claimed in claim 1, wherein said support is a poly(ethylene terephthalate) film.

3. A thermally processable imaging element as claimed in claim 1, wherein said imaging layer comprises:
   (a) photographic silver halide,
   (b) an image-forming combination comprising
      (i) an organic silver salt oxidizing agent, with
      (ii) a reducing agent for the organic silver salt oxidizing agent, and
   (c) a toning agent.

4. A thermally processable imaging element as claimed in claim 1, wherein said imaging layer comprises:
   (a) photographic silver halide,
   (b) an image-forming combination comprising
      (i) silver behenate, with
      (ii) a phenolic reducing agent for the silver behenate,
   (c) a succinimide toning agent, and
   (d) an image stabilizer.

5. A thermally processable imaging element as claimed in claim 1, wherein said protective overcoat layer comprises poly(silicic acid).

6. A thermally processable imaging element as claimed in claim 1, wherein said protective overcoat layer comprises poly(silicic acid) and a water-soluble hydroxyl-containing monomer or polymer.

7. A thermally processable imaging element as claimed in claim 1, wherein said protective overcoat layer comprises poly(silicic acid) and poly(vinyl alcohol).

8. A thermally processable imaging element as claimed in claim 1, wherein said electroconductive agent is present in a separate layer on the same side of said support as said backing layer.

9. A thermally processable imaging element as claimed in claim 1, wherein said electroconductive agent is present in a separate layer on the same side of said support as said imaging layer.

10. A thermally processable imaging element as claimed in claim 1, wherein said electroconductive agent is incorporated in said backing layer.

11. A thermally processable imaging element as claimed in claim 1, wherein said electroconductive agent is a donor-doped metal oxide, a metal oxide containing oxygen deficiencies or a conductive nitride, carbide or boride.

12. A thermally processable imaging element as claimed in claim 1, wherein said electroconductive agent comprises vanadium pentoxide.

13. A thermally processable imaging element as claimed in claim 1, wherein said electroconductive agent is antimony-doped tin oxide.

14. A thermally processable imaging element as claimed in claim 1, wherein said backing layer comprises poly(silicic acid) and polyvinyl alcohol.

15. A thermally processable imaging element as claimed in claim 1, wherein said backing layer comprises polymethylmethacrylate, cellulose acetate, crosslinked polyvinyl alcohol, a terpolymer of acrylonitrile, vinylidene chloride and 2-(methacryloyloxy)ethyltrimethylammonium methosulfate, crosslinked gelatin, a polyacrylamide, a polyester, a polyurethane, or combinations thereof.

16. A thermally processable imaging element as claimed in claim 1, wherein the same fluorosurfactant is incorporated in both the backing layer and the protective overcoat layer.

17. A thermally processable imaging element is claimed in claim 1, wherein each of said backing layer and said protective overcoat layer contains a fluorosurfactant comprising fluorine-substituted aliphatic moieties of 6 to 16 carbon atoms and polyether moieties wherein the polyether chain varies from 9 to 14 ether linkages.

18. A thermally processable imaging element as claimed in claim 1, wherein the fluorosurfactant in each of said backing layer and said protective overcoat layer is a fluoroalkyl polyether or mixture of fluoroalkyl polyethers of the formula:

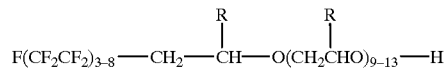

wherein R is hydrogen or methyl.

19. A thermally processable imaging element as claimed in claim 1, wherein said protective overcoat layer comprises a fluorosurfactant represented by the formula:

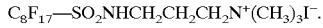

20. A thermally processable imaging element as claimed in claim 1, wherein said backing layer comprises a nonionic fluorosurfactant comprised of a mixture of fluoroaliphatic polymeric esters.

21. A thermally processable imaging element as claimed in claim 1, wherein said protective overcoat layer comprises a fluorosurfactant which is a mixture of compounds of the formulae:

and

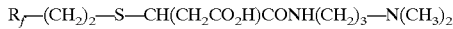

wherein $R_f$ is a mixture of $C_6F_{13}$, $C_8F_{17}$ and $C_{10}F_{21}$.

22. A thermally processable imaging element as claimed in claim 1, wherein said protective overcoat layer comprises a fluorosurfactant represented by the formula:

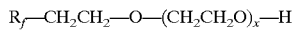

wherein $R_f$ is a mixture of fluoroalkyl groups averaging about $C_8F_{17}$ and x is 8–12.

23. A cut sheet of a thermally processable imaging element, said element comprising:
   (1) a polyethylene terephthalate support,
   (2) a photothermographic imaging layer on one side of said support, said photothermographic imaging layer comprising:
      (a) photographic silver halide,
      (b) an image-forming combination comprising
         (i) silver behenate, with
         (ii) a phenolic reducing agent for the silver behenate,
      (c) a succinimide toning agent, and
      (d) an image stabilizer;
   (3) a protective overcoat layer which is an outermost layer on the same side of said support as said photothermographic imaging layer, said protective overcoat layer containing poly(silicic acid), poly(vinyl alcohol), polymeric matte particles comprising a polymeric core surrounded by a layer of colloidal inorganic particles, and a fluorosurfactant;
   (4) an antistatic layer containing vanadium pentoxide as an electroconductive agent on the side of said support opposite to said photothermographic imaging layer; and
   (5) a backing layer which is an outermost layer on the side of said support opposite to said photothermographic imaging layer, said backing layer comprising a fluorosurfactant and matte particles consisting of a cross-linked copolymer of methyl methacrylate and ethylene glycol dimethacrylate dispersed in a polymethylmethacrylate binder; wherein the amount of fluorosurfactant in each of said protective overcoat layer and said backing layer being sufficient to serve as a triboelectric charge control agent and effective in providing essentially the same triboelectric charging characteristics to said backing layer as to said protective overcoat layer.

24. A thermally processable imaging element as claimed in claim 16, wherein the amount of fluorosurfactant in the overcoat layer is the same as the amount of fluorosurfactant in the backing layer.

25. A thermally processable imaging element as claimed in claim 24, wherein the amount of fluorosurfactant in the overcoat layer is different from the amount of fluorosurfactant in the backing layer.

26. A thermally processable imaging element as claimed in claim 1, wherein the fluorosurfactant in the overcoat layer is different from the fluorosurfactant in the backing layer.

27. A thermally processable imaging element as claimed in claim 26, wherein, the amount of fluorosurfactant in the overcoat layer is the same as the amount of fluorosurfactant in the backing layer.

28. A thermally processable imaging element as claimed in claim 26, wherein the amount of fluorosurfactant in the overcoat layer is the different from the amount of fluorosurfactant in the backing layer.

* * * * *